United States Patent [19]
Pan et al.

[11] Patent Number: 5,493,627
[45] Date of Patent: Feb. 20, 1996

[54] WAVEGUIDE PACK

[75] Inventors: J. J. Pan, Melbourne, Fla.; Richard W. Lancaster, Plymouth, Mass.; Wesley Libby, Rochester, Mass.; Michael Manning, North Falmouth, Mass.; William Pauplis, Hudson, Mass.

[73] Assignee: Sippican, Inc., Marion, Mass.

[21] Appl. No.: 809,038

[22] Filed: Dec. 16, 1991

Related U.S. Application Data

[63] Continuation of Ser. No. 653,868, Feb. 8, 1991, abandoned, which is a continuation of Ser. No. 144,522, Jan. 15, 1988, abandoned.

[51] Int. Cl.$^6$ .............................. F41G 7/32; F42B 15/04; G02B 6/44
[52] U.S. Cl. .................... 385/111; 244/3.12; 425/DIG. 7
[58] Field of Search ..................................... 385/110, 111; 425/DIG. 7; 244/3.12

[56] References Cited

U.S. PATENT DOCUMENTS

| | | |
|---|---|---|
| 3,215,029 | 11/1965 | Woodcock ................................ 264/1.5 |
| 3,319,815 | 5/1967 | Simpson et al. ........................ 244/3.12 |
| 3,473,872 | 10/1969 | Okamura . |
| 3,613,619 | 10/1971 | Nobel et al. ............................. 244/3.12 |
| 3,669,772 | 6/1972 | Strack . |
| 3,817,595 | 6/1974 | Edelman et al. . |
| 4,361,381 | 11/1982 | Williams . |
| 4,371,234 | 2/1983 | Parfree . |
| 4,414,165 | 11/1983 | Oestreich . |
| 4,483,585 | 11/1984 | Takami . |
| 4,501,084 | 2/1985 | Mori . |
| 4,525,711 | 6/1985 | Gery . |
| 4,534,618 | 8/1985 | Brüggendieck . |
| 4,557,558 | 12/1985 | Bresser . |
| 4,558,255 | 12/1985 | Genovese et al. . |
| 4,564,261 | 1/1986 | Kojima et al. . |
| 4,586,079 | 4/1986 | Cooper . |
| 4,613,210 | 9/1986 | Pollard . |
| 4,650,280 | 3/1987 | Sedlmayer . |
| 4,651,917 | 3/1987 | Gould et al. . |
| 4,652,323 | 3/1987 | Butt . |
| 4,724,316 | 2/1988 | Morton ................................. 250/231 R |
| 4,749,254 | 6/1988 | Seaver ................................... 350/96.29 |
| 4,770,370 | 9/1988 | Pinson ................................... 244/3.12 |

FOREIGN PATENT DOCUMENTS 3201019  8/1983  Germany .............................. 244/3.12

OTHER PUBLICATIONS

Yen et al; "Birefringent Optical Filters in Single–Mode Fiber", Jun. 1981, Opt. Lett., vol. 6, #6, pp. 278–280.
Kono, M. B.; "Microprocessor Controlled Fiber Optic Cable Winding Machine"; Oct. 14, 1981, NTIS AO–000906/96.
Fox et al., SPIE vol. 326, Fiber Optics Technology '82 pp. 14–22 (1982).
Naruse et al., IOOOC Digest, pp. 271–274 (1977).
Gloge, Bell Systems Technical Journal, vol. 54, pp. 245–262 (1975).
DuPont Elvamide Literature (May 1983).
Air Products Vinac Literature.
Kornblith et al,, NUSC Report No. 831181 (1983).
Fox et al., "High Strength Rapid Payout Fiber Optic Assembly," Report for Period Aug. 1978–May 1979 (1979).
Hoffman et al, Int'l Wire & Cable Symp. Proc., pp. 378–381 (1981).

Primary Examiner—Nelson Moskowitz
Attorney, Agent, or Firm—Testa, Hurwitz & Thibeault

[57] ABSTRACT

A waveguide pack for transmission of information that includes a length of a dielectric waveguide wound into a free-standing coil with an inner diameter of less than three inches and coated with a binder suited to maintaining the waveguide in the coil, and a method for preparing the pack.

16 Claims, 2 Drawing Sheets

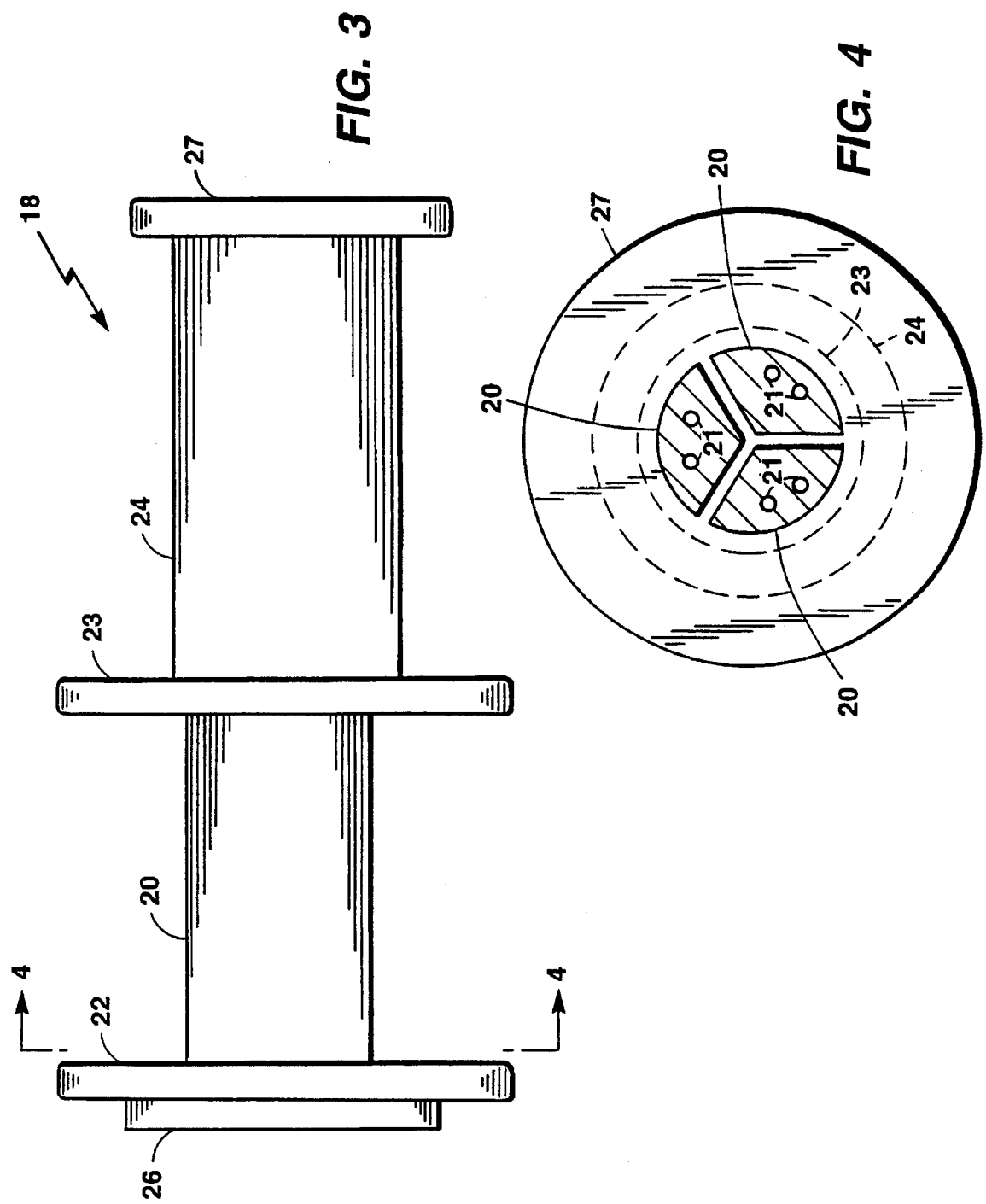

WAVEGUIDE PACK

This is a continuation of application Ser. No. 07/653,868, filed Feb. 8, 1991, now abandoned, which is a continuation Ser. No. 07/144,522 filed on Jan. 15, 1988, now abandoned.

BACKGROUND OF THE INVENTION

This invention relates to winding waveguides into packs.

A waveguide is a three-dimensional structure made of a dielectric or metallic material that is capable of supporting propagating electromagnetic waves. The physical dimensions of the waveguide are such that one dimension is longer than the wavelength of the propagating wave while the other two dimensions are comparable to or shorter than the wavelength. One consequence of this physical structure is to confine the direction of the propagating wave (and therefore the signal information that the wave carries) to the direction of the waveguide's longer dimension. The waveguide also exhibits discrete propagating modes. The number of propagating modes can be altered by altering a dimension of the waveguide such as the core in the case of optical fibers.

Glass fibers are one type of optical waveguide. All glass optical fibers typically contain a silica core surrounded by a cladding layer and coated with an acrylate buffer resin to protect the core from scratches. These fibers, which are often reinforced with strengthening fibers to form a fiber cable, are used primarily for telecommunications. Both single and multiple mode fibers have been used for this purpose. Single mode fibers can support only one propagation mode at a time, while the larger core multiple mode fibers can support many such modes simultaneously.

There have been efforts to use optical fibers for communications between a vessel, e.g., a submarine, and a high velocity projectile such as a missile or torpedo. Fiber cable has been wound and stored in the projectile. Upon launch, the cable unwinds to permit communication between the projectile and the vessel. It has also been proposed to use optical fibers to communicate between a vessel and a lower velocity projectile such as a communications buoy.

SUMMARY OF THE INVENTION

In general, the invention features a waveguide pack that includes a length of a dielectric waveguide wound into a free-standing coil having an inner diameter of less than three inches and coated with a binder suited to maintaining the waveguide in coiled form. The pack is prepared by winding the waveguide around a collapsible mandrel to form the coil while applying the binder to the wound waveguide, and collapsing and removing the mandrel before the binder has fully set without disturbing the conformation of the coil to form the pack.

In preferred embodiments, the waveguide is an unreinforced glass or plastic fiber. The fiber may be multiple mode or, more preferably, single mode. The preferred shape of the coiled pack is a cylinder.

The tack level of the binder preferably is sufficient to permit the waveguide to be unwound at low payout velocities (e.g., under 100 knots, more preferably under 25 knots) smoothly and uniformly as a single strand from the interior of the coil. The inner diameter of the pack preferably is greater than or equal to the minimum diameter at which the optical transmission of the wound waveguide is substantially the same (e.g., the attenuation does not vary by more than about 2%) as the optical transmission of the waveguide before it is wound into the coil. Where the waveguide is a single mode glass fiber, this condition is met when the inner diameter is greater than or equal to approximately 1.3 inches. The outer diameter of the pack preferably is less than three inches.

The waveguide preferably operates at a wavelength between 600 and 1600 nanometers, more preferably 1275 and 1325 nanometers, and is pretwisted to prevent kinking during the despooling operation. The total length of waveguide forming the coil is greater than 5 kilometers and, more preferably, 15 kilometers.

The binder is preferably an alcohol-based resin. Examples of preferred binders include polyvinyl acetate and polyamides.

The invention provides waveguide packs in which optical waveguides are wound into small diameter coils without a significant corresponding loss in optical transmission. Thus, the packs can be stored within narrow diameter projectiles (e.g., 3 inches or less), thereby minimizing storage space and maximizing system deployment options from various host platforms. The packs are despooled as a single strand smoothly and uniformly, one turn at a time, at low tension without kinking, making the packs useful in low velocity underwater operations (e.g., under 25 knots).

Other features and advantages of the invention will be apparent from the following description of the preferred embodiment thereof, and from the claims.

DESCRIPTION OF THE PREFERRED EMBODIMENTS

FIG. 3 is a side view of a collapsible mandrel used to prepare the pack.

FIG. 4 is a cross-sectional view taken at 4—4 of the mandrel shown in FIG. 3.

Figure 1:
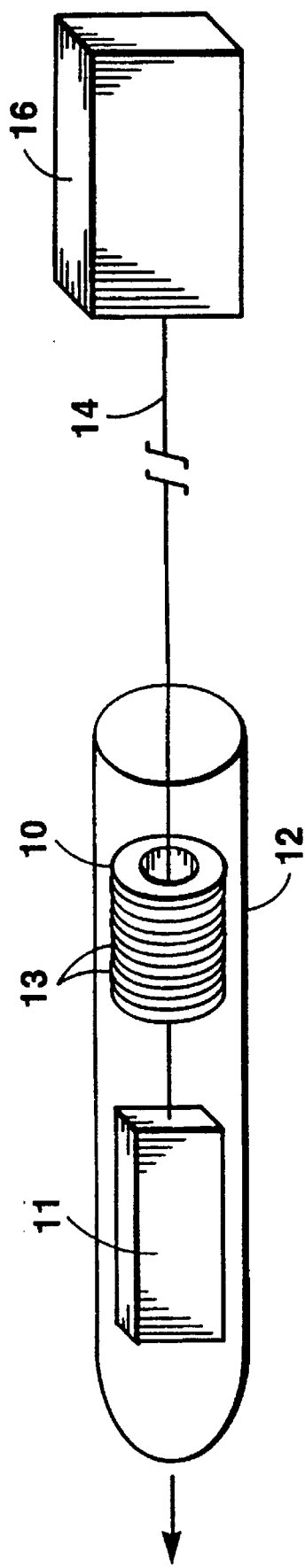
FIG. 1 is a plan view of an optical waveguide pack stored in a projectile launched from a submarine.
Figure 2:
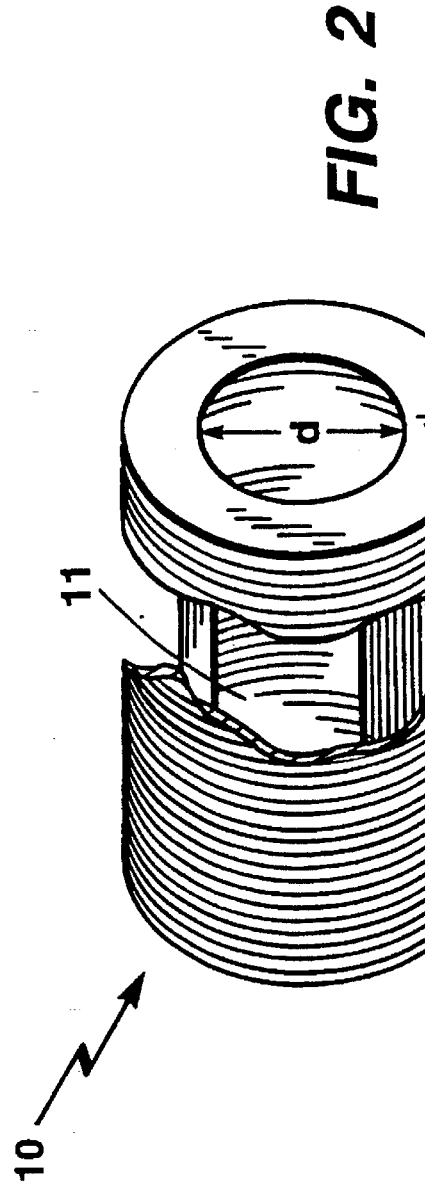
FIG. 2 is a perspective view, partially cut away, of the optical waveguide pack.

There is shown in FIGS. 1 and 2 an optical waveguide pack 10. Pack 10 is a free-standing coil consisting of an optical fiber 14 wound around a hollow core 11. The total length of optical fiber 14 forming pack 10 is about 10.5 kilometers. The inner diameter of pack 10 (i.e., the diameter of core 11) is about 1.3 inches.

Pack 10 is stored in a hollow projectile 12 (e.g., a communications buoy) that is launched from a submarine 16; typical launch velocities are on the order of 25 knots or less. Projectile 12 is equipped with circuitry 11 for controlling communication through fiber 14. During launch, fiber 14 despools from the interior of pack 10 smoothly and uniformly, one turn at a time. Projectile 12 then communicates information to submarine 16 by sending an optical signal through fiber 14.

A binder 13 is applied to every fourth layer of the coiled pack. Binder 13 is an alcohol-based polymeric resin. Alcohol, rather than water-based, solutions are preferred because water causes stress cracking of the glass fiber; such stress cracking decreases the tensile strength of the fiber. The preferred alcohol is methanol. Preferred binders are polyvinyl acetate resins (e.g., Vinac B15 resin commercially available from Air Products and Chemicals, Inc.) and polyamide resins (e.g., Elvamide 8063 resin commercially available from Dupont).

The concentration of binder 13 is adjusted to achieve a tack level sufficient to hold pack 10 together as a free-standing coil without interfering with the ability of pack 10 to unwind. Moreover, the binder is preferably sufficiently tacky to help prevent the fiber from kinking as it despools by applying tension to the fiber. Preferred binder concentrations range from 3 to 19% by weight.

Fiber 14 is a single mode optical fiber having a glass core (5–10 microns diameter) coated with a cladding layer and a protective ultraviolet-cured acrylate resin layer; the total fiber diameter is approximately 250 microns. An example of a suitable fiber is Spectran Product No. SG-102-E-1-155-02 commercially available from Spectran Corp. The wavelength at which the fiber operates (i.e. the wavelength of the transmitted electronic signal) is 1300 nanometers.

Single mode fibers, which can support only one mode at a time, are preferred over multiple mode fibers, which can support more than one mode simultaneously. Single mode fibers are preferred because the ratio of the glass core to cladding of the single mode fibers is approximately 5–10 times smaller than the multiple mode core. This difference makes the single mode fiber less susceptible to microbending, curvature bending, and pressure-induced losses. Such losses can present a problem when the fiber is wound into very small diameter coils because they increase signal attenuation relative to the unwound fiber, thereby causing the optical transmission of the fiber to degrade.

When received from the manufacturer, fiber 14 typically is loosely wound around a delivery spool having a diameter that is roughly ten times that of pack 10. It has been found that by winding fiber 14 into a pack having an inner diameter of approximately 1.3 inches, the attenuation of the coiled fiber in the pack (and thus the transmission) differs insignificantly from that of the fiber as received from the manufacturer. Thus, by using an inner diameter of about 1.3 inches, a compact pack having essentially the same transmission properties as the as-received fiber can be prepared.

Fiber 14 is pre-twisted to prevent it from kinking as it despools; kinking is a particular problem in low velocity (less than 100 knots, typically less than 25 knots) underwater operations. The degree of pre-twist is sufficient to counteract the tendency of fiber 14 to kink as it despools at low payout velocities, thereby causing fiber 14 to despool as a straight, unkinked fiber. The tension applied to fiber 14 by binder 13 also helps prevent kinking.

Pack 10 is prepared by winding fiber 14 around a collapsible mandrel 18 fitted to a Meteor winding machine (Model No. MO1). Referring to FIGS. 3 and 4, mandrel 18 features three spaced pie-shaped aluminum sections 20 separated from each other by a gap of approximately 0.050 inches. Each section is approximately 11 inches long and includes 120° of arc. Together sections 20 form a cylinder having a diameter of about 1.3 inches, the same as the inner diameter of pack 10, around which fiber 14 is wound. The surfaces of sections 20 which contact fiber 14 are 32 finish.

Plastic discs 22, 23 act as endcaps for the finished pack. A hollow aluminum spacer tube 24 in contact with disc 23 is used to adjust the length of the wound pack. Plastic positioning discs 26, 27 sandwich the entire assembly and exert pressure along the axis of mandrel 18 to hold the assembly together.

Discs 22, 23, 26, 27 and both ends of sections 20, contain six holes 21 through which steel dowel pins (not shown) are inserted. The pins, which extend approximately ¼ inch into sections 20 from both sides, also help to hold mandrel 18 together.

The individual pieces of mandrel 18 are assembled, and it is then placed in the winding machine outfitted with a source of fiber 14. Fiber 14 is wound at a winding speed of 250 r.p.m. at 2 ounce tension around mandrel 18 to form pack 10 having 61(±5) layers of fiber approximately 0.6 inches deep. An alcohol solution of binder 13 is applied every fourth layer of fiber during the winding operation with a flat-edged brush (width=1 inch).

Once winding is complete, mandrel 18 is collapsed and removed, and pack 10, in the form of a free-standing coil, is stored until needed. Mandrel 18 is removed before binder 13 has set so that pack 10 can relax without damaging the wound fiber. The ability of pack 10 to relax is important because during winding the pressure of the wind generated by tension imposes stresses on the fiber, thereby enhancing microbending losses and impairing the fiber's optical transmission properties. When the mandrel is removed, the fiber relaxes with a corresponding reduction in stress and, consequently, pressure-induced microbending losses. If binder 13 sets Too quickly, relaxation is hampered. Thus, the setting rate of binder 13 is preferably low enough to prevent binder 13 from setting before winding is complete and mandrel 18 is removed.

Other embodiments are within the following claims.

We claim:

1. A waveguide pack for transmission of information, said pack comprising a length of dielectric, unreinforced, single mode fiber said fiber being coated with a binder and said fiber wound into a coil having multiple layers positioned at varying radius distances from the cylindrical axis of the coil and having an inner diameter of less than three inches, said binder having a tack level permitting said fiber to be unwound at velocities less than 100 knots as a single strand from said coil, and said binder having a setting rate and tack level suited to permit said coil to relax, after being wound, into a state in which microbending losses due to stresses imposed on said fiber during winding are reduced to the extent that the optical transmission of the wound fiber in said free-standing configuration is substantially the same as the optical transmission of the fiber before it is wound.

2. The waveguide pack of claim 1 wherein said dielectric waveguide is a glass fiber.

3. The waveguide pack of claim 1 wherein said dielectric waveguide is a plastic fiber.

4. The waveguide pack of claim 1 wherein the tack level of said binder is selected to permit said waveguide to be unwound at velocities less than 100 knots as a single strand from the interior of said coil.

5. The waveguide pack of claim 1 wherein the tack level of said binder is selected to permit said waveguide to be unwound at velocities less than 25 knots as a single strand from the interior of said coil.

6. The waveguide pack of claim 1 wherein the outer diameter of said coil is less than three inches.

7. The waveguide pack of claim 1 wherein said waveguide is a single mode glass fiber and said inner diameter is greater than or equal to approximately 1.3 inches.

8. The waveguide pack of claim 1 wherein said waveguide operates at a wavelength between 600 and 1600 nanometers.

9. The waveguide pack of claim 1 wherein said waveguide operates at a wavelength between 1275 and 1325 nanometers.

10. The waveguide pack of claim 1 wherein said waveguide is pretwisted to an extent sufficient to prevent said waveguide from kinking when despooled from said coil.

11. The waveguide pack of claim 1 wherein said binder is an alcohol-based resin.

12. The waveguide pack of claim 1 wherein said binder comprises polyvinyl acetate.

13. The waveguide pack of claim 1 wherein said binder comprises a polyamide.

14. The waveguide pack of claim 1 wherein the total length of said optical waveguide in said pack is greater than 5 kilometers.

15. The waveguide pack of claim 1 wherein the total length of said waveguide in said pack is greater than 15 kilometers.

16. The waveguide pack of claim 1 wherein said pack is in the shape of a cylinder.

* * * * *